US012498662B2

(12) United States Patent
Kamiya et al.

(10) Patent No.: US 12,498,662 B2
(45) Date of Patent: Dec. 16, 2025

(54) INFORMATION PROCESSING APPARATUS AND NON-TRANSITORY RECORDING MEDIUM STORING COMPUTER READABLE CONTROL PROGRAM

(71) Applicant: Konica Minolta, Inc., Tokyo (JP)

(72) Inventors: Masahiro Kamiya, Toyohashi (JP); Takahiro Tsujimoto, Toyokawa (JP); Takeshi Tamada, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 6 days.

(21) Appl. No.: 18/405,499

(22) Filed: Jan. 5, 2024

(65) Prior Publication Data

US 2024/0241470 A1 Jul. 18, 2024

(30) Foreign Application Priority Data

Jan. 13, 2023 (JP) ................................ 2023-003573

(51) Int. Cl.
*G03G 15/00* (2006.01)

(52) U.S. Cl.
CPC ..... *G03G 15/5016* (2013.01); *G03G 15/5062* (2013.01)

(58) Field of Classification Search
CPC .......... G03G 15/5016; G03G 15/5029; G03G 15/5062; G03G 15/6594; G03G 2215/00738; G03G 2215/00742; G03G 2215/00751
See application file for complete search history.

(56) References Cited

U.S. PATENT DOCUMENTS 11,537,075 B2 * 12/2022 Taki .................. G03G 15/5029

FOREIGN PATENT DOCUMENTS

JP 2020154268 3/2019

* cited by examiner

*Primary Examiner* — Hoang X Ngo
(74) *Attorney, Agent, or Firm* — BakerHostetler

(57) ABSTRACT

An information processing apparatus including a hardware processor that: acquires output information of a recording medium on which an image is formed by an image forming apparatus and recording medium-related information, and determines, based on the output information and the recording medium-related information that is acquired, information on a recording medium that is recommended for use in the image forming apparatus or information on a recording medium that is not recommended for use in the image forming apparatus.

11 Claims, 15 Drawing Sheets

FIG. 6

| SERIAL NUMBER | DATE | THE NUMBER OF DAYS | THE NUMBER OF PASSED SHEETS OF PLAIN PAPER | RANKING OF THE NUMBER OF PASSED SHEETS | JAM OCCURRENCE | JAM OCCURRENCE RATE | RANKING OF LOW JAM OCCURRENCE RATE | HIGH SHEET PASSING RELIABILITY APPARATUS RANKING |
|---|---|---|---|---|---|---|---|---|
| **A0421** | 2020/4/24 23:18 | 261 | **287597** | 1 | 5 | **0.00002** | 1 | **1** |
| **A0152** | 2020/2/6 9:53 | 360 | **208578** | 4 | 6 | **0.00003** | 4 | **2** |
| **A0393** | 2020/3/18 23:59 | 318 | **243177** | 2 | 8 | **0.00003** | 7 | **3** |
| **A1234** | 2020/6/13 10:29 | 232 | **212539** | 3 | 7 | **0.00003** | 8 | **4** |
| A1139 | 2020/4/1 10:04 | 303 | 161265 | 8 | 5 | 0.00003 | 5 | 5 |
| A1111 | 2020/1/31 2:15 | 351 | 155758 | 12 | 3 | 0.00002 | 2 | 6 |
| A2222 | 2020/3/19 0:14 | 308 | 160563 | 9 | 5 | 0.00003 | 6 | 7 |
| A0234 | 2020/4/29 23:53 | 261 | 195385 | 5 | 8 | 0.00004 | 12 | 8 |
| A0420 | 2020/2/22 3:08 | 343 | 153618 | 13 | 6 | 0.00004 | 11 | 9 |
| A0981 | 2020/6/17 10:53 | 228 | 162968 | 6 | 9 | 0.00006 | 18 | 10 |
| A0569 | 2019/12/28 0:48 | 393 | 156006 | 11 | 8 | 0.00005 | 16 | 11 |
| A7879 | 2020/12/3 1:22 | 58 | 162036 | 7 | 10 | 0.00006 | 23 | 12 |
| A0738 | 2020/7/9 8:49 | 202 | 151876 | 14 | 8 | 0.00005 | 17 | 13 |
| A2157 | 2017/12/6 8:17 | 232 | 139844 | 19 | 6 | 0.00004 | 13 | 14 |
| A1657 | 2020/5/23 7:17 | 243 | 140913 | 18 | 7 | 0.00005 | 15 | 15 |
| A5533 | 2020/3/18 4:33 | 312 | 109066 | 32 | 3 | 0.00003 | 3 | 16 |
| A0036 | 2020/2/26 23:30 | 340 | 139598 | 20 | 8 | 0.00006 | 20 | 17 |
| A0255 | 2018/3/16 13:08 | 294 | 108717 | 33 | 4 | 0.00004 | 10 | 18 |
| A5432 | 2020/9/3 1:21 | 144 | 144154 | 15 | 10 | 0.00007 | 28 | 19 |
| A0045 | 2020/5/15 2:43 | 261 | 109224 | 31 | 5 | 0.00005 | 14 | 20 |
| A0199 | 2021/1/29 8:25 | 2 | 0 | 1513 | | 0.00000 | 1513 | 1513 |
| A2206 | 2021/1/14 2:29 | 17 | 0 | 1514 | | 0.00000 | 1514 | 1514 |
| A0217 | 2021/1/19 4:19 | 10 | 0 | 1515 | | 0.00000 | 1515 | 1515 |
| A7218 | 2021/1/16 4:00 | 3 | 0 | 1516 | | 0.00000 | 1516 | 1516 |
| A0227 | 2021/1/29 3:33 | 2 | 0 | 1517 | | 0.00000 | 1517 | 1517 |

FIG. 7

| PAPER TYPE | BRAND | BASIS WEIGHT | IR TRANSMITTANCE | B TRANSMITTANCE | G REFLECTANCE |
|---|---|---|---|---|---|
| PLAIN PAPER | C123 | 220 | 0.136 | 0.055 | 3.103 |
| PLAIN PAPER | B132 | 100 | 0.268 | 0.180 | 3.383 |
| PLAIN PAPER | 1aba | 69 | 0.384 | 0.284 | 3.116 |
| PLAIN PAPER | N231 | 67 | 0.375 | 0.283 | 3.206 |
| PLAIN PAPER | pgood | 70 | 0.371 | 0.275 | 2.990 |
| PLAIN PAPER | Y321 | 67 | 0.394 | 0.285 | 3.290 |
| PLAIN PAPER | AAA | 68 | 0.387 | 0.224 | 3.400 |
| PLAIN PAPER | X123 | 250 | 0.116 | 0.049 | 3.261 |
| PLAIN PAPER | Q555 | 250 | 0.119 | 0.048 | 3.511 |
| PLAIN PAPER | xtrag | 72 | 0.128 | 0.055 | 3.508 |

FIG. 9

| OPTION | SHEET BRAND | SHEET CATEGORY | BASIS WEIGHT | MATCHING RATE |
|---|---|---|---|---|
| 1 | AAA | PLAIN PAPER | 68.2 | 93.4% |
| 2 | Y321 | PLAIN PAPER | 66.9 | 91% |
| 3 | N231 | PLAIN PAPER | 67.3 | 89% |
| — | — | — | — | — |

FIG. 10

| SERIAL NUMBER | DATE | THE NUMBER OF DAYS | THE NUMBER OF PASSED SHEETS OF PLAIN PAPER | RANKING OF THE NUMBER OF PASSED SHEETS | JAM OCCURRENCE | JAM OCCURRENCE RATE | RANKING OF HIGH JAM OCCURRENCE RATE | LOW SHEET PASSING RELIABILITY APPARATUS RANKING |
|---|---|---|---|---|---|---|---|---|
| **A5250** | 2020/1/29 23:50 | 365 | **157644** | 10 | 20 | **0.00013** | 7 | **1** |
| **A1583** | 2020/6/19 9:05 | 226 | **141431** | 17 | 15 | **0.00011** | 11 | **2** |
| **A0195** | 2020/2/5 5:25 | 361 | **118303** | 28 | 35 | **0.00030** | 1 | **3** |
| **A0851** | 2020/4/23 8:23 | 280 | **125223** | 26 | 17 | **0.00014** | 5 | **4** |
| A9625 | 2020/5/23 6:18 | 242 | 125941 | 24 | 15 | 0.00012 | 9 | 5 |
| A0899 | 2020/12/3 1:22 | 58 | 162036 | 7 | 10 | 0.00006 | 28 | 6 |
| A5417 | 2020/6/26 1:20 | 215 | 142878 | 16 | 11 | 0.00008 | 20 | 7 |
| A0175 | 2020/4/21 1:21 | 375 | 113117 | 30 | 15 | 0.00013 | 6 | 8 |
| A5001 | 2020/9/3 1:21 | 144 | 144154 | 15 | 10 | 0.00007 | 23 | 9 |
| A9982 | 2020/6/17 10:53 | 228 | 162968 | 6 | 9 | 0.00006 | 33 | 10 |
| A5337 | 2020/3/6 10:08 | 155 | 125747 | 25 | 11 | 0.00009 | 17 | 11 |
| A0659 | 2020/6/18 2:19 | 227 | 101077 | 38 | 15 | 0.00015 | 4 | 12 |
| A0254 | 2020/4/29 23:53 | 261 | 195385 | 5 | 8 | 0.00004 | 39 | 13 |
| A9303 | 2020/3/18 23:59 | 318 | 243177 | 2 | 8 | 0.00003 | 44 | 14 |
| A0955 | 2020/6/13 10:29 | 232 | 212539 | 3 | 7 | 0.00003 | 43 | 15 |
| A5069 | 2019/12/28 0:48 | 393 | 156006 | 11 | 8 | 0.00005 | 35 | 16 |
| A1592 | 2020/5/19 1:59 | 249 | 129827 | 22 | 9 | 0.00007 | 24 | 17 |
| A1111 | 2020/5/27 7:28 | 249 | 122000 | 27 | 10 | 0.00008 | 19 | 18 |
| A1769 | 2020/11/6 5:45 | 78 | 132055 | 21 | 9 | 0.00007 | 26 | 19 |
| A5227 | 2020/4/14 9:32 | 290 | 102741 | 37 | 11 | 0.00011 | 10 | 20 |
| AAAA | 2021/1/29 8:25 | 2 | 0 | 1513 | | 0.00000 | 1513 | 1513 |
| A0256 | 2021/1/14 2:29 | 17 | 0 | 1514 | | 0.00000 | 1514 | 1514 |
| A9207 | 2021/1/19 4:19 | 10 | 0 | 1515 | | 0.00000 | 1515 | 1515 |
| A9218 | 2021/1/16 4:00 | 3 | 0 | 1516 | | 0.00000 | 1516 | 1516 |
| A5220 | 2021/1/29 3:33 | 2 | 0 | 1517 | | 0.00000 | 1517 | 1517 |

FIG. 12

| OPTION | SHEET BRAND | SHEET CATEGORY | BASIS WEIGHT | MATCHING RATE |
|---|---|---|---|---|
| 1 | 1aba | PLAIN PAPER | 69.2 | 96.3% |
| 2 | pgood | PLAIN PAPER | 70.1 | 87.6% |
| 3 | xtrag | PLAIN PAPER | 71.9 | 70.1% |
| — | — | — | — | — |

INFORMATION PROCESSING APPARATUS AND NON-TRANSITORY RECORDING MEDIUM STORING COMPUTER READABLE CONTROL PROGRAM

CROSS-REFERENCE TO RELATED APPLICATION

This application claims priority to Japanese Patent Application No. 2023-003573 filed on Jan. 13, 2023, the entire disclosure of which is incorporated herein by reference.

Background

1. Technological Field

The present invention relates to an information processing apparatus and a non-transitory recording medium storing a computer readable control program.

2. Description of the Related Art

An electrophotographic image forming apparatus feeds a sheet from a sheet feed tray onto a conveyance path, conveys the sheet along the conveyance path, forms toner images on the sheet being conveyed, and then thermally fixes the toner images onto the sheet, thereby forming an image.

In order to appropriately form an image on a sheet, it is necessary to select appropriate image forming condition according to attributes of the sheet such as a paper type and a sheet size.

Japanese Unexamined Patent Application Publication No. 2020-154268 discloses the following related art. Sheet attributes such as a sheet type and a plurality of image forming parameters corresponding to the sheet attributes are stored, and when the sheet attributes to be used for image formation is received, a recommendation degree for each image forming parameter determined based on the evaluation of the occurrence of a jam, the fixation of a color material, and the like in the past image formation is displayed. According to the related art, a user can easily set an appropriate image forming parameter by selecting the image forming parameter based on the displayed information.

Summary

However, there are a huge number of types of sheets in the market, and among them, there are inferior paper on which it is difficult to form a favorable image by an electrophotographic image forming apparatus. Using such inferior paper causes a trouble such as a paper jam, which is disadvantageous to the user. In addition, if a trouble such as a paper jam frequently occurs while the user is unaware that the paper is inferior, the user may not know how to solve the trouble.

The present invention has been made to solve such an issue. That is, an object of the present invention is to provide an information processing apparatus and a non-transitory recording medium storing a computer readable control program capable of suppressing occurrence of a trouble such as a paper jam by enabling easy recognition of an appropriate recording medium.

To achieve at least one of the abovementioned objects, according to an aspect of the present invention, a device reflecting one aspect of the present inventions comprises the followings.

An information processing apparatus including: a hardware processor that: acquires output information of a recording medium on which an image is formed by an image forming apparatus and recording medium-related information; and determines, based on the output information and the recording medium-related information that is acquired, information on a recording medium that is recommended for use in the image forming apparatus or information on a recording medium that is not recommended for use in the image forming apparatus.

To achieve at least one of the abovementioned objects, according to an aspect of the present invention, a recording medium reflecting one aspect of the present inventions comprises the followings.

A non-transitory recording medium storing a computer readable control program for causing a computer to perform: acquiring output information of a recording medium on which an image is formed by an image forming apparatus and recording medium-related information; and determining, based on the output information and the recording medium-related information that is acquired, information on a recording medium that is recommended for use in the image forming apparatus or information on a recording medium that is not recommended for use in the image forming apparatus.

The objects, features, and characteristics of this invention other than those set forth above will become apparent from the description given herein below with reference to preferred embodiments illustrated in the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 is a diagram indicating information accumulated in an accumulated information DB for a specific period of time and a calculation result of a high sheet passing reliability apparatus ranking based on the information;

FIG. 7 is a diagram indicating sheet brand reference data;

FIG. 9 is a diagram indicating a determination result of sheet brands having a higher matching rate to physical property values of a sheet passed through a high sheet passing reliability apparatus;

FIG. 10 is a diagram indicating information accumulated in the accumulated information DB for a specific period of time and a calculation result of a low sheet passing reliability apparatus ranking based on the information;

FIG. 12 is a diagram indicating a determination result of sheet brands having a higher matching rate to the physical property values of a sheet passed through a low sheet passing reliability apparatus;

DETAILED DESCRIPTION OF EMBODIMENTS

Figure 1:
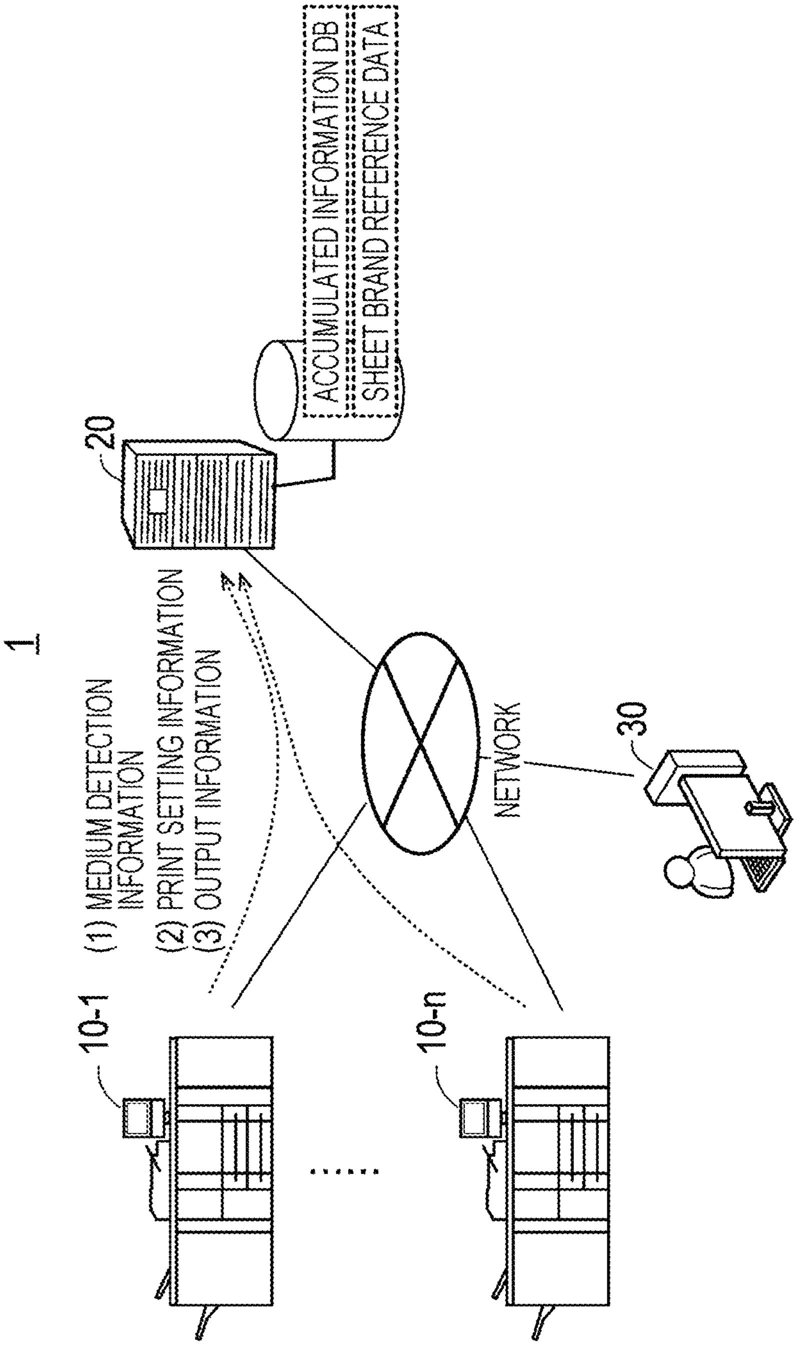
FIG. 1 is a view illustrating a schematic configuration of an information processing system.

Hereinafter, one or more embodiments of the present invention will be described with reference to the drawings. However, the scope of the invention is not limited to the disclosed embodiments.

Hereinafter, an information processing apparatus and a non-transitory recording medium storing a computer readable control program according to an embodiment of the present invention will be described with reference to the drawings. Note that in the drawings, the same elements are denoted by the same reference signs, and redundant description thereof will be omitted. In addition, dimensional ratios in the drawings are exaggerated for convenience of description and may be different from actual ratios. In the present embodiment, recording medium includes a sheet (including thin paper, plain paper, thick paper, recycled paper, and coated paper), a long sheet, an envelope, a postcard, and various types of films. Hereinafter, in order to simplify the description, a case where the recording medium is a sheet will be described as an example.

Figure 2:
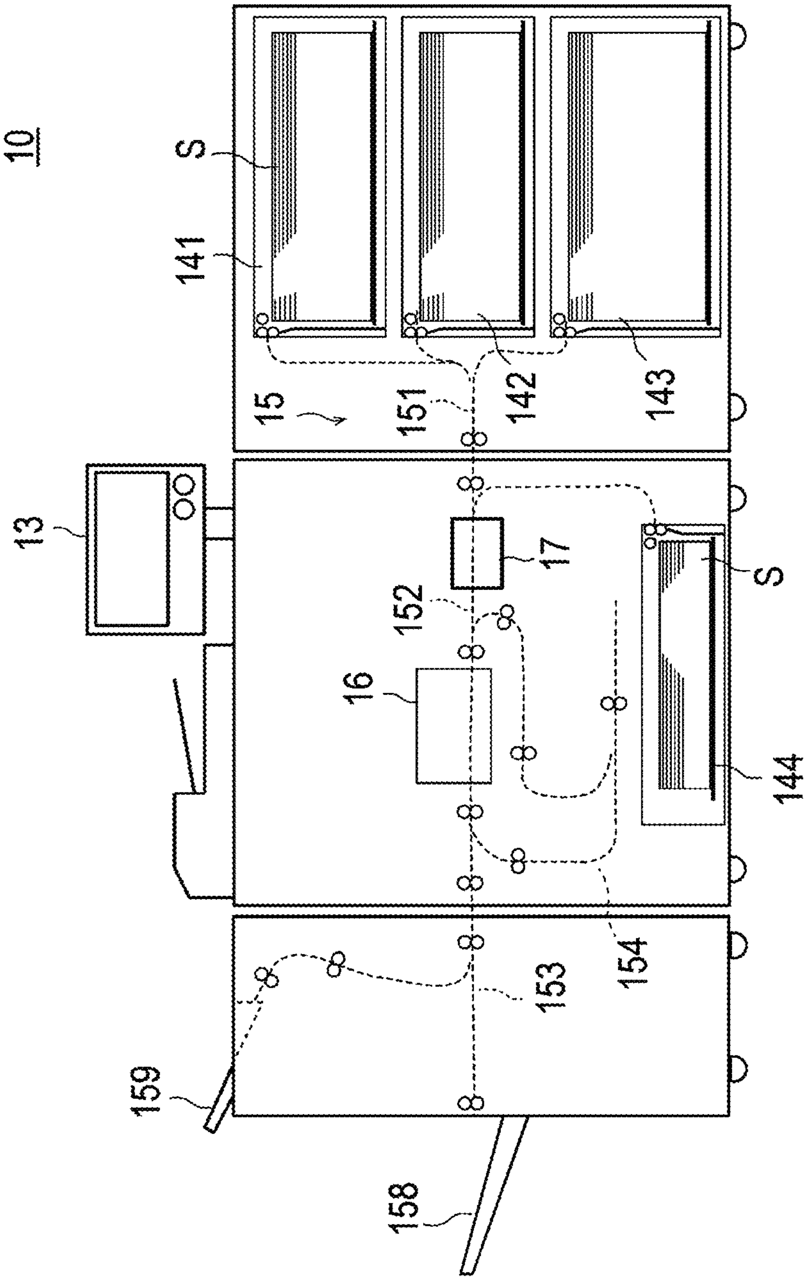
FIG. 2 is a schematic sectional view illustrating an overall configuration of an image forming apparatus.
Figure 3:
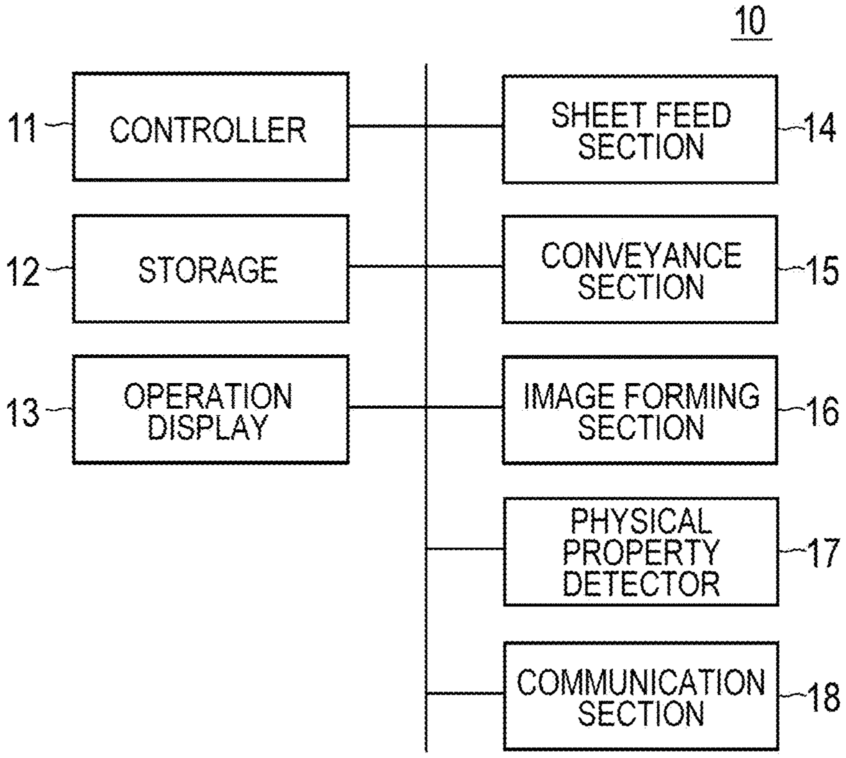
FIG. 3 is a block diagram illustrating a hardware configuration of the image forming apparatus.

FIG. 1 is a view illustrating a schematic configuration of an information processing system 1 including image forming apparatuses 10. FIG. 2 is a schematic sectional view illustrating an overall configuration of the image forming apparatus 10. FIG. 3 is a block diagram illustrating a hardware configuration of the image forming apparatus 10.

The information processing system 1 includes one or more image forming apparatuses 10 (10-1 to 10-*n*) and a server 20. The information processing system 1 may include a terminal device 30. The image forming apparatus 10 is constituted by, for example, a multifunction peripheral (MFP). The terminal device 30 is a PC, a tablet terminal, a smartphone, or the like, and is used by a user such as a service staff management company that maintains and manages the image forming apparatus 10 or the like. These apparatuses are communicably connected to each other via a network. The server 20 is constituted by, for example, a cloud server. The server 20 may be constituted by an on-premise server.

The server 20 acquires, from each image forming apparatus 10, medium detection information of a sheet S on which an image is formed by each image forming apparatus 10 by receiving the media detection information from each image forming apparatus 10. The server 20 may acquire, from each image forming apparatus 10, output information of the sheet S on which an image is formed by each image forming apparatus 10 (hereinafter, simply referred to as "output information") by receiving the output information from each image forming apparatus 10. The server 20 may acquire, from each image forming apparatus 10, print setting information on an image formed on the sheet S by each image forming apparatus 10 by receiving the print setting information from each image forming apparatus 10. The medium detection information and the print setting information constitute recording medium-related information. The print setting information constitutes setting information regarding a recording medium. The medium detection information constitutes physical property information (information of physical property values) regarding a recording medium.

The medium detection information includes physical property information of the sheet S detected by a physical property detector 17. The physical property information of the sheet S may include at least any of IR transmittance, B transmittance, G reflectance, and a basis weight. The IR transmittance may be the transmittance of the light having a wavelength of the near-infrared light longer than a wavelength of the visible light (hereinafter, referred to as a "first irradiation light"). The B transmittance may be the transmittance of the blue light included in the visible light (hereinafter, referred to as a "second irradiation light"). The G reflectance may be the reflectance of the green light included in the visible light (hereinafter, referred to as a "third irradiation light").

The output information is information related to output of the sheet S in the image forming apparatus 10. The output information may include jam occurrence information and information of the number of passed sheets S (the number of printed sheets S). The jam occurrence information constitutes information on whether or not printing (image formation) has been normally performed on the recording medium. The information of the number of printed sheets S constitutes information on the number of printed recording media.

The print setting information is information of print settings included in a print job. The print setting information includes, for example, information of a paper type. The print job is the general term of a printing instruction to be given to the image forming apparatus 10 and includes print data and the print settings. The print data is data of a document to be printed, and may include various kinds of data such as image data, vector data, and text data, for example. Specifically, the print data may be portable document format (PDF) data, page description language (PDL) data, or tagged image file format (TIFF) data. The print settings are settings regarding the image formation onto the sheet S, and includes various kinds of settings such as the paper type, the number of pages, the number of printed copies, selection of color or monochrome, and page layout, for example.

Figure 5:
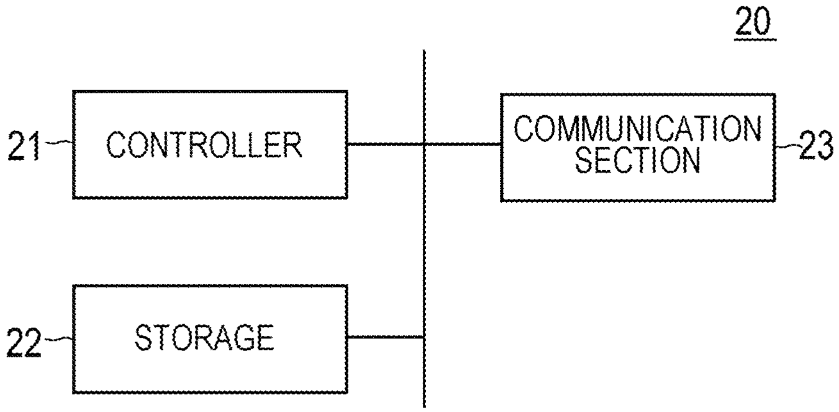
FIG. 5 is a block diagram illustrating a hardware configuration of a server.

The server 20 accumulates the medium detection information, the output information, and the print setting information acquired from each image forming apparatus 10 in an accumulated information DB (database) in a storage 22 (see FIG. 5). The server 20 stores, in the storage 22, below-described sheet brand reference data for extracting (identifying) a sheet brand from the medium detection information.

The server 20 determines, based on the output information and the medium detection information accumulated in the accumulated information DB, information on a sheet S that is recommended for use in the image forming apparatus 10 or information on a sheet S that is not recommended for use in the image forming apparatus 10. The server 20 transmits the determination result to each image forming apparatus 10.

The image forming apparatus 10, the server 20, and the terminal device 30 will be described in more detail.

Image Forming Apparatus 10

The image forming apparatus 10 includes a controller 11, a storage 12, an operation display 13, a sheet feed section 14, a conveyance section 15, an image forming section 16, the physical property detector 17, and a communication section 18. The controller 11, together with the physical property detector 17, constitutes a detection section.

The controller 11 includes a CPU and memories such as a RAM and a ROM. The CPU controls the above-described respective components and performs various kinds of arithmetic processing according to programs. Functions of the image forming apparatus 10 are implemented by the CPU executing the corresponding program. Details of functions of the controller 11 will be described in detail below. The CPU constitutes a hardware processor.

The storage 12 is an auxiliary storage device that stores therein various types of programs including an operating system and various kinds of data. The storage 12 includes, for example, a hard disk, a solid state drive, a flash memory, a ROM, and the like.

The operation display 13 includes a touch panel, a numeric keypad, a start button, a stop button, and the like, and is used for displaying various kinds of information and inputting various kinds of instructions. The user can set, via the operation display 13, sheet information such as the size, type (paper type) and the like of sheets stored in respective sheet feed trays. In addition, the user can give an instruction to execute a print job through the operation of the operation display 13.

The sheet feed section 14 includes one or a plurality of sheet feed trays 141 to 144, and feeds the sheet S stored in the sheet feed tray 141 or the like one by one to send the sheet S to a conveyance path of the conveyance section 15.

The conveyance section 15 includes conveyance paths 151 to 154 and sheet ejection trays 158 and 159. In addition, the conveyance section 15 further includes sheet detection sensors (sheet presence or absence detection sensors) arranged on the conveyance paths 151 to 154, a plurality of conveyance rollers, and drive motors that drive the conveyance rollers (none of which are illustrated). The physical property detector 17 is arranged on the conveyance path 152 upstream with respect to the image forming section 16. In the sheet feed section 14 or on each of the conveyance paths 151 to 154 of the conveyance section 15, the sheet detection sensor detects the presence or absence of the sheet S at a predetermined timing, thereby detecting whether the jam (conveyance failure) of the sheet S occurs.

The conveyance paths 151 to 154 guide the sheet S fed from the sheet feed section 14 to the sheet ejection tray 158 or 159 through the image forming section 16. The conveyance path 154 for double-sided printing, which is used when images are formed on the both sides, receives a sheet S having an image formed on the front surface (first surface) thereof to reverse the front and back of the sheet S, and guides the sheet S again to the image forming section 16 on the conveyance path 152 that is the main conveyance path. The image forming section 16 forms an image on the back surface (second surface) of the sheet S.

The image forming section 16 forms a toner image on the sheet S by, for example, an electrophotographic method. The image forming section 16 includes writing sections, photosensitive drums, developing sections that store a two-component developer containing toner and carrier, a primary transfer section, a secondary transfer section, a fixing section, and the like (none of which are illustrated). The plurality of writing sections, the plurality of photosensitive drums, or the plurality of developing sections corresponds to each of the basic colors of yellow (Y), magenta (M), cyan (C), and black (K). Each toner image formed on the photosensitive drum by the developing section of the corresponding color is transferred onto an intermediate transfer belt, being superimposed on the intermediate transfer belt, and transferred onto the sheet S conveyed on the conveyance path 152 by the secondary transfer section. The fixing section performs fixing processing of heating and pressing on the toner image formed on the sheet S by the secondary transfer section arranged on the upstream side with respect thereto, thereby fixing the toner image on the sheet S. Image forming parameters, which includes output settings such as output voltage settings for the developing sections and the transfer sections of the image forming section 16, a charging electrode or surface potential setting for the photosensitive drum, and a temperature setting for the fixing section, may be appropriately adjusted according to a physical property of the sheet S, the printing mode, and temperature and humidity conditions. The image forming parameters are also referred to as process conditions or image forming conditions.

The physical property detector 17, together with the controller 11, detects the medium detection information. As described above, the medium detection information may include, as the physical property information of the sheet, the IR transmittance, the B transmittance, the G reflectance, and the basis weight.

The communication section 18 is an interface for network connection with an external device such as a PC.

Functions of the controller 11 will be described. Hereinafter, in order to simplify the description, a case where the sheet S is plain paper will be described as an example.

The controller 11 calculates the medium detection information from detection values by the physical property detector 17.

Figure 4:
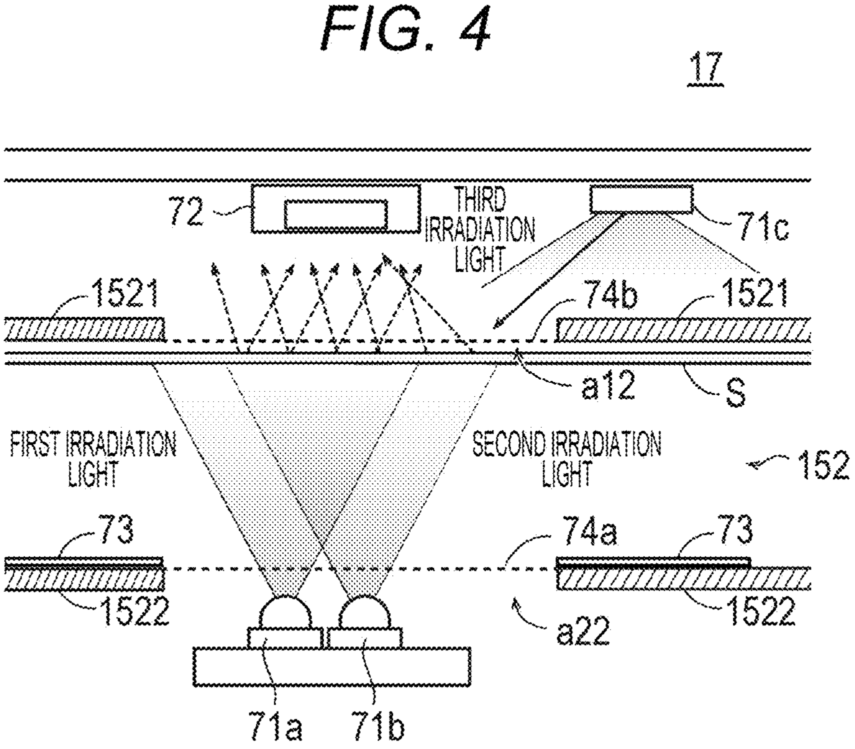
FIG. 4 is a schematic view illustrating a configuration of a physical property detector.

FIG. 4 is a schematic view illustrating a configuration of the physical property detector 17. The physical property detector 17, which is constituted by transmissive and reflective optical sensors that detect physical property values of the sheet S conveyed on the conveyance path 152, includes light emitters and a light receiver to measure the light amount of the light transmitted through the sheet S and the light amount of the light reflected by the sheet S (the transmittance and the reflectance). The controller 11 may cause the physical property detector 17 to perform the measurement while conveying the sheet S, or may cause the physical property detector 17 to perform the measurement while temporarily stopping the sheet S at a detection position.

The physical property detector 17 includes a plurality of light emitters 71 and a single light receiver 72. The light emitters 71 includes a first light emitter 71*a*, a second light emitter 71*b*, and a third light emitter 71*c*. The first light emitter 71*a*, the second light emitter 71*b*, and the third light emitter 71*c* irradiate an irradiation region with the first irradiation light, the second irradiation light, and the third irradiation light, respectively. The conveyance path 152 is provided between upper and lower guide plates 1521 and 1522. The upper guide plate 1521 of the conveyance path 152 is provided with an opening a12. In addition, the lower guide plate 1522 is also provided with an opening a22 at a position opposed to the opening a12. The openings a12 and a22 have the same shape, for example, a rectangular shape.

In order to prevent a foreign substance such as paper dust from the sheet S passing through the conveyance path 152 from adhering to the openings a12 and a22, transparent sheets 74*a* and 74*b* made of PET or the like that allow the wavelengths of respective irradiation lights to pass therethrough are attached at the openings a12 and a22.

The first light emitter 71*a* emits the first irradiation light. The second light emitter 71*b* emits the second irradiation light. The first light emitter 71*a* and the second light emitter 71*b* are both arranged on the opposite side to the light receiver 72 with respect to the conveyance path 152, and the third light emitter 71*c* is provided on the same side as the light receiver 72 and in the vicinity of the light receiver 72. The third light emitter 71*c* emits the third irradiation light toward the irradiation region (opening a12).

The third irradiation light is emitted toward the conveyance path 152 provided between the upper and lower guide plates 1521 and 1522. A reflector 73 is provided on the inner side of the lower guide plate 1522 provided in the vicinity of the first light emitter 71*a* and the second light emitter 71*b*. The reflector 73 is, for example, coated with green, which is the same color as the third irradiation light, to reflect the third irradiation light. The reflector 73 does not reflect the first irradiation light (near-infrared light) and the second irradiation light (blue light), which do not have the same color as the reflector 73.

When detecting the medium detection information, the controller 11 controls the first light emitter 71*a* and the second light emitter 71*b* to emit the first irradiation light and the second irradiation light, respectively, at different timings. The light receiver 72 receives the first irradiation light and the second irradiation light to detect the respective light amounts of the first irradiation light and the second irradiation light, and outputs, to the controller 11, the detected light amount of the first irradiation light and the detected light amount of the second irradiation light. Similarly, in the physical property detector 17, the sheet S conveyed to the position of the opening a12 is irradiated with the first irradiation light and the second irradiation light. The light receiver 72 receives the transmitted light of the first irradiation light and the second irradiation light (a first transmitted light and a second transmitted light) to detect the respective light amounts of the first transmitted light and the second transmitted light, and outputs, to the controller 11, the detected light amount of the first transmitted light and the detected light amount of the second transmitted light. That is, the light receiver 72 detects the first irradiation light and the second irradiation light when the sheet S is absent, and detects the first transmitted light and the second transmitted light when the sheet S is present at the opening a12. The controller 11 calculates the IR transmittance by dividing the light amount of the first transmitted light when the sheet S is present by the light amount of the first irradiation light when the sheet S is absent. The controller 11 calculates the B transmittance by dividing the light amount of the second transmitted light when the sheet S is present by the light amount of the second irradiation light when the sheet S is absent.

Similarly for the third light emitter 71*c*, the controller 11 detects a first reflected light by the light receiver 72, which is the reflected light of the third irradiation light at the reflector 73 when the sheet S is absent, and detects a second reflected light, which is the reflected light of the third irradiation light at the surface of the sheet S when the sheet S is present at the opening a12. The controller 11 calculates the G reflectance by dividing the light amount of the second reflected light by the light amount of the first reflected light.

The controller 11 may detect, based on the intensity of the light that passing through the sheet S and received by the light receiver, the basis weight of the sheet S by a known method.

The physical property detector 17 may include a sheet thickness detector and a surface property detector. In the sheet thickness detector, the shaft position of a movable driven roller is displaced according to the thickness of the sheet S sandwiched between the pair of conveyance rollers to be conveyed. The sheet thickness detector detects the thickness of the sheet S by measuring the height of the displaced shaft. The surface property detector emits the light at an angle with respect to the sheet surface (for example, at an incident angle of 75 degrees) to detect the light amounts of the specular reflected light and the diffuse reflected light using a plurality of light receivers, and detects the surface property of the sheet S based on the absolute values and ratios of the intensity of the light received by the respective light receivers. The thickness and the surface property of the sheet S may be included in the medium detection information as the physical property value of the sheet S.

The controller 11 detects a jam of the sheet S using the sheet detection sensors provided on the conveyance paths 151 to 154 of the conveyance section 15. The controller 11 may detect a jam of the sheet S by detecting a state in which the sheet S is absent at a predetermined timing using the sheet detection sensor provided on the conveyance path 152 downstream with respect to the fixing section. The controller 11 may detect that the sheet S has been normally printed by detecting a state in which the sheet S is present at a predetermined timing using the sheet detection sensor provided on the conveyance path 152 downstream with respect to the fixing section.

The controller 11 transmits, to the server 20, a serial number that is unique and capable of identifying each image forming apparatus 10, the medium detection information, and the output information. The controller 11 may further transmit the print setting information to server 20. More specifically, for example, the controller 11 transmits, to the server 20, the serial number of the image forming apparatus 10 that is the source of its transmission, the IR transmittance, the B transmittance, the G reflectance, the basis weight, the jam occurrence information, the number of passed sheets, and the paper type. The IR transmittance, the B transmittance, the G reflectance, and the basis weight correspond to the medium detection information. The jam occurrence information and the number of printed sheets correspond to the output information. The paper type corresponds to the print setting information. The controller 11 may transmit, to the server 20, the serial number of the image forming apparatus 10, the medium detection information, the output information, and the print setting information at predetermined time intervals (for example, each day). The controller 11 may transmit, to the server 20, the serial number of the image forming apparatus 10, the medium detection information, the output information, and the print setting information every time an image is formed on the sheet S.

Server 20

FIG. 5 is a block diagram illustrating a hardware configuration of the server 20. The server 20 includes a controller 21, the storage 22, and a communication section 23. Basic configuration and functions of these components of the server 20 are similar to the basic configuration and functions of corresponding components of the image forming apparatus 10, and hence redundant description thereof will be omitted. The controller 21 constitutes a determination section. The controller 21, together with the communication section 23, constitutes an acquisition section and a transmission section. The storage 22 constitutes a storing section.

The controller 21 acquires the serial number of the image forming apparatus 10, the output information of the sheet S on which an image is formed by the image forming apparatus 10, and the medium detection information by receiving the serial number of the image forming apparatus 10, the output information of the sheet S on which an image is formed by the image forming apparatus 10, and the medium detection information from each image forming apparatus 10. The controller 21 may further acquire the print setting information when an image is formed on the sheet S by receiving the print setting information from each image forming apparatus 10. Specifically, the controller 21 may acquire, from the server 20, the serial number of the image forming apparatus 10 that is the source of its transmission, the IR transmittance, the B transmittance, the G reflectance, the basis weight, the jam occurrence information, the number of passed sheets, and the paper type. The controller 21 accumulates the acquired serial number of the image forming apparatus 10, the acquired output information, the acquired medium detection information, and the acquired print setting information by storing the serial number of the image forming apparatus 10, the output information, the medium detection information, and the print setting information in the accumulated information DB of the storage 22.

The controller 21 determines, based on the output information and the medium detection information acquired from each image forming apparatus 10 to be accumulated in the accumulated information DB, the information on a sheet S that is recommended for use in the image forming apparatus 10 and/or the information on a sheet S that is not recommended for use in the image forming apparatus 10. The controller 21 may determine, based on the output information, the medium detection information, and the print setting information, the information on a sheet S that is recommended for use in the image forming apparatus 10 and/or the information on a sheet S that is not recommended for use in the image forming apparatus 10.

The controller 21 may determine, based on the output information and the print setting information, the information on a sheet S that is recommended for use in the image forming apparatus 10 and/or the information on a sheet S that is not recommended for use in the image forming apparatus 10. Hereinafter, in order to simplify the description, a case where the controller 21 determines, based on the IR transmittance, the B transmittance, the G reflectance, the basis weight, the jam occurrence information and the number of passed sheets, the information on a sheet S that is recommended for use in the image forming apparatus 10 and the information on a sheet S that is not recommended for use in the image forming apparatus 10 will be described as an example.

The controller 21 ranks, as a ranking of the number of passed sheets, the image forming apparatuses 10 in descending order of the number of passed sheets using the serial numbers. The controller 21 calculates the jam occurrence rate for each serial number by dividing the number of jammed sheets S, which is the jam occurrence information, by the number of passed sheets.

The controller 21 ranks, as a ranking of the low jam occurrence rate, the image forming apparatuses 10 in ascending order of the jam occurrence rate using the serial numbers. The controller 21 ranks, as a high sheet passing reliability apparatus ranking, the image forming apparatuses 10 using the serial numbers from the viewpoint of an apparatus having a large number of passed sheets and the low jam occurrence rate. The high sheet passing reliability apparatus ranking means a ranking of apparatuses in ascending order of the jam occurrence rate in a case of a relatively large number of passed sheets. For example, the controller 21 may determine the high sheet passing reliability apparatus ranking in ascending order of the sum of the ranking of the number of passed sheets and the ranking of the low jam occurrence rate. The controller 21 may determine the high sheet passing reliability apparatus ranking in ascending order of a weighted sum obtained by applying predetermined weighting between the ranking of the number of passed sheets and the ranking of the low jam occurrence rate.

The controller 21 ranks, as a ranking of the high jam occurrence rate, the image forming apparatuses 10 in descending order of the jam occurrence rate using the serial numbers. The controller 21 ranks, as a low sheet passing reliability apparatus ranking, the image forming apparatuses 10 using the serial numbers from the viewpoint of an apparatus having a large number of passed sheets and the high jam occurrence rate. The low sheet passing reliability apparatus ranking means a ranking of apparatuses in descending order of the jam occurrence rate in a case of a relatively large number of passed sheets. For example, the controller 21 may determine the low sheet passing reliability apparatus ranking in ascending order of the sum of the ranking of the number of passed sheets and the ranking of the high jam occurrence rate. The controller 21 may determine the low sheet passing reliability apparatus ranking in ascending order of a weighted sum obtained by applying predetermined weighting between the ranking of the number of passed sheets and the ranking of the high jam occurrence rate.

FIG. 6 is a diagram indicating information accumulated in an accumulated information DB for a specific period of time and a calculation result of a high sheet passing reliability apparatus ranking based on the information.

In the example of FIG. 6, the serial number, date (date and time of data reception from the image forming apparatus), the number of days (the number of days for data accumulation), the number of passed sheets of plain paper (the number of passed sheets), and the jam occurrence (the number of jammed sheets) are accumulated in the accumulated information DB. In addition, the calculation results of the ranking of the number of passed sheets, the low jam occurrence rate, the ranking of the jam occurrence rate, and the high sheet passing reliability ranking are indicated. The high sheet passing reliability ranking is calculated as a ranking in ascending order of the sum of the ranking of the number of passed sheets and the ranking of the low jam occurrence rate.

The controller 21 extracts the image forming apparatus 10 having the highest rank in the high sheet passing reliability ranking (hereinafter, referred to as "high sheet passing reliability apparatus") based on the serial number. In the example illustrated in FIG. 6, the image forming apparatus 10 having the serial number "A0421" may be extracted as the high sheet passing reliability apparatus.

The controller 21 determines, based on the extracted medium detection information acquired from the image forming apparatus 10 having the highest rank in the high sheet passing reliability ranking, the information on a sheet S that is recommended for use in the image forming apparatus 10. Specifically, the IR transmittance, the B transmittance, the G reflectance, and the basis weight included in the medium detection information are compared with the sheet brand reference data, and a sheet brand having the higher matching rate is determined (extracted) as the information on a sheet S that is recommended for use in the image forming apparatus 10.

FIG. 7 is a diagram indicating sheet brand reference data.

In the example of FIG. 7, the IR transmittance, the B transmittance, the G reflectance, and the basis weight, which are the physical property values of each of sheet brands of plain paper, are registered as the sheet brand reference data in the table. The sheet brand reference data may be a table defining the relationship between reference values of the respective physical property values of the sheet S and the sheet brand. The reference value is a physical property value as a reference for identifying the sheet brand, and may be determined by the user. The reference value is determined based on, for example, a measurement value of the physical property value of the sheet S measured by a relatively high-precision measurement device in a standard environment. The sheet brand constitutes information on a recording medium (identification information on a recording medium, which is information for distinguishing the recording medium from other recording media). The information on a recording medium may include manufacturer information (for example, a manufacturer name) of the sheet S. The sheet brand reference data constitutes a table defining the relationship between the physical property values of a recording medium and the information on a recording medium. The sheet brand reference data may be registered by, for example, being input by the user to the terminal device 30 and transmitted from the terminal device 30 to the server 20 to be stored in the storage 22.

The controller 21 statistically processes each of the IR transmittance, the B transmittance, the G reflectance, and the basis weight of all of the sheets S passed through the high sheet passing reliability apparatus to calculate the representative values (for example, the peak values) of the IR transmittance, the B transmittance, the G reflectance, and the basis weight.

Figure 8:
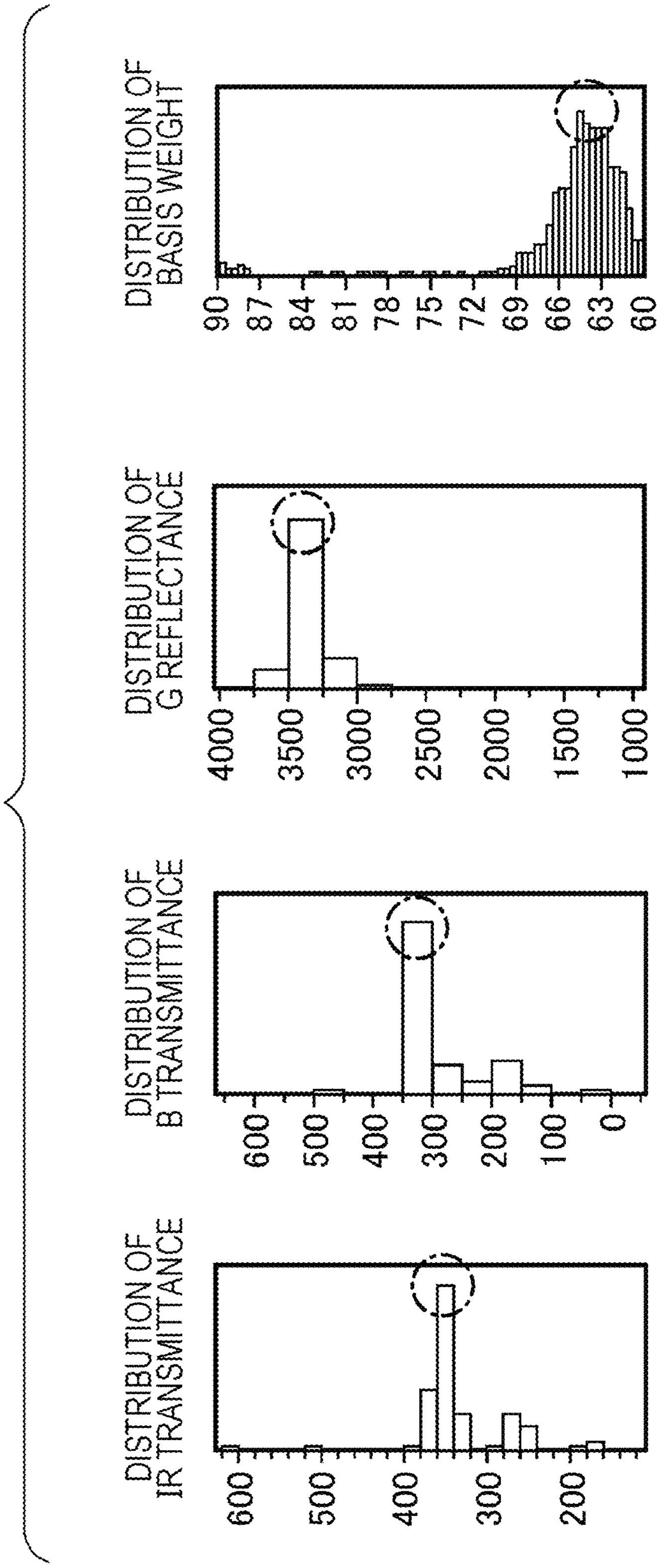
FIG. 8 is a diagram illustrating histograms calculated through statistical processing of IR transmittance, B transmittance, G reflectance, and a basis weight.

FIG. 8 is a diagram illustrating histograms calculated through statistical processing of IR transmittance, B transmittance, G reflectance, and a basis weight.

In the example of FIG. 8, the peak value indicated by a dot-dash line circle in each histogram of the IR transmittance, the B transmittance, the G reflectance, and the basis weight may be calculated as the representative value of each of the IR transmittance, the B transmittance, the G reflectance, and the basis weight (hereinafter, also simply referred to as "representative value"). For example, for the basis weight, 64 g, which is the peak value, is calculated as the representative value.

The controller 21 refers to the sheet brand reference data to compare the reference value of each physical property value defined in the sheet brand reference data with the representative value of each physical property value of the sheet S included in the medium detection information. Accordingly, the controller 21 calculates the matching rate of each physical property value of the sheet S to each physical property value in the sheet brand reference data. The controller 21 determines one or more sheet brands having a higher matching rate among the calculated matching rates. The matching rate is, for example, a value obtained by calculating the Euclidean distance between the reference value and the representative value for each sheet brand and normalizing the calculated value. The normalization is performed to make the matching rate be in a range of 0% to 100%, for example. In this case, the normalization may be performed such that the matching rate of a sheet brand having the physical property value with the Euclidean distance of 0 from the representative value is set at 100%, and the matching rate of a sheet brand having the physical property value with the Euclidean distance of 100 from the representative value is set at 0%. The matching rate may be calculated by a known method other than the above-described method.

FIG. 9 is a diagram indicating a determination result of sheet brands having a higher matching rate to the physical property values of the sheet S passed through the high sheet passing reliability apparatus.

In the example of FIG. 9, a sheet brand called "AAA" has the highest matching rate and is determined as the sheet brand that is recommended for use in the image forming apparatus 10. The sheet brands called "Y321" and "N231" having the second and third highest matching rates are also determined as the sheet brand that is recommended for use in the image forming apparatus 10. The determined sheet brand has the physical property values that are relatively close to the physical property values of the sheet S that is passed through the high sheet passing reliability apparatus in a relatively large amount, so that the determined sheet brand is considered to be a sheet brand having a low possibility of causing the jam due to the sheet.

FIG. 10 is a diagram indicating information accumulated in the accumulated information DB for a specific period of time and a calculation result of a low sheet passing reliability apparatus ranking based on the information.

In the example of FIG. 10, the serial number, date (date and time of data reception from the image forming apparatus), the number of days (the number of days for data accumulation), the number of passed sheets of plain paper (the number of passed sheets), and the jam occurrence (the number of jammed sheets) are accumulated in the accumulated information DB. In addition, the calculation results of the ranking of the number of passed sheets, the jam occurrence rate, the ranking of the high jam occurrence rate, and the low sheet passing reliability ranking are indicated. The low sheet passing reliability ranking is calculated as a ranking in ascending order of the sum of the ranking of the number of passed sheets and the ranking of the high jam occurrence rate.

The controller 21 extracts the image forming apparatus 10 having the highest rank in the low sheet passing reliability ranking (hereinafter, referred to as "low sheet passing reliability apparatus") based on the serial number. In the example illustrated in FIG. 10, the image forming apparatus 10 having the serial number "A5250" may be extracted as the low sheet passing reliability apparatus.

The controller 21 determines, based on the extracted medium detection information acquired from the low sheet passing reliability apparatus, the information on a sheet S that is not recommended for use in the image forming apparatus 10. Specifically, the IR transmittance, the B transmittance, the G reflectance, and the basis weight included in the medium detection information are compared with the sheet brand reference data, and a sheet brand having the higher matching rate is determined (extracted) as the information on a sheet S that is not recommended for use in the image forming apparatus 10.

The controller 21 statistically processes each of the IR transmittance, the B transmittance, the G reflectance, and the basis weight of all of the sheets S passed through the low sheet passing reliability apparatus to calculate the representative values (for example, the peak values) of the IR transmittance, the B transmittance, the G reflectance, and the basis weight.

Figure 11:
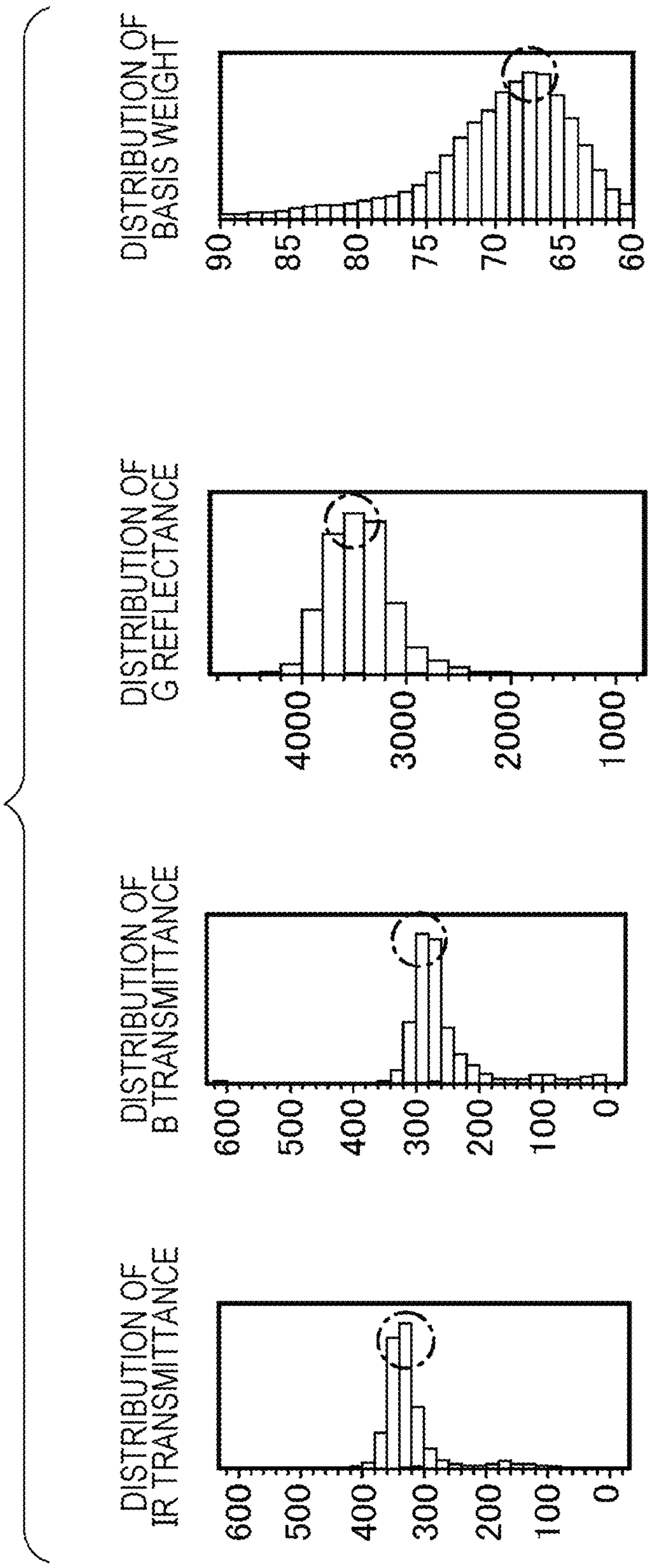
FIG. 11 is a diagram illustrating histograms calculated through statistical processing of the IR transmittance, the B transmittance, the G reflectance, and the basis weight.

FIG. 11 is a diagram illustrating histograms calculated through statistical processing of the IR transmittance, the B transmittance, the G reflectance, and the basis weight.

In the example of FIG. 11, the peak value indicated by a dot-dash line circle in each histogram of the IR transmittance, the B transmittance, the G reflectance, and the basis weight may be calculated as the representative value of each of the IR transmittance, the B transmittance, the G reflectance, and the basis weight.

The controller 21 refers to the sheet brand reference data to compare the reference value of each physical property value defined in the sheet brand reference data with the representative value of each physical property value of the sheet S included in the medium detection information. Accordingly, the controller 21 calculates the matching rate of each physical property value of the sheet S to each physical property value in the sheet brand reference data. The controller 21 determines one or more sheet brands having a higher matching rate among the calculated matching rates. The matching rate is, for example, a value obtained by calculating the Euclidean distance between the reference value and the representative value for each sheet brand and normalizing the calculated value. The normalization is performed to make the matching rate be in a range of 0% to 100%, for example. In this case, the normalization may be performed such that the matching rate of a sheet brand having the physical property value with the Euclidean distance of 0 from the representative value is set at 100%, and the matching rate of a sheet brand having the physical property value with the Euclidean distance of 100 from the representative value is set at 0%. The matching rate may be calculated by a known method other than the above-described method.

FIG. 12 is a diagram indicating a determination result of sheet brands having a higher matching rate to the physical property values of the sheet S passed through the low sheet passing reliability apparatus.

In the example of FIG. 12, a sheet brand called “laba” has the highest matching rate and is determined as the sheet brand that is not recommended for use in the image forming apparatus 10. The sheet brands called “pgood” and “xtrag” having the second and third highest matching rates are also determined as the sheet brand that is not recommended for use in the image forming apparatus 10. The determined sheet brand has the physical property values that are relatively close to the physical property values of the sheet S that is passed through the low sheet passing reliability apparatus in a relatively large amount, so that the determined sheet brand is considered to be a sheet brand having a high possibility of causing the jam due to the sheet.

The controller 21 causes the communication section 23 to transmit, to each image forming apparatus 10, the determination result of the sheet brand that is recommended for use in the image forming apparatus 10 and/or the sheet brand that is not recommended for use in the image forming apparatus 10.

Figure 13:
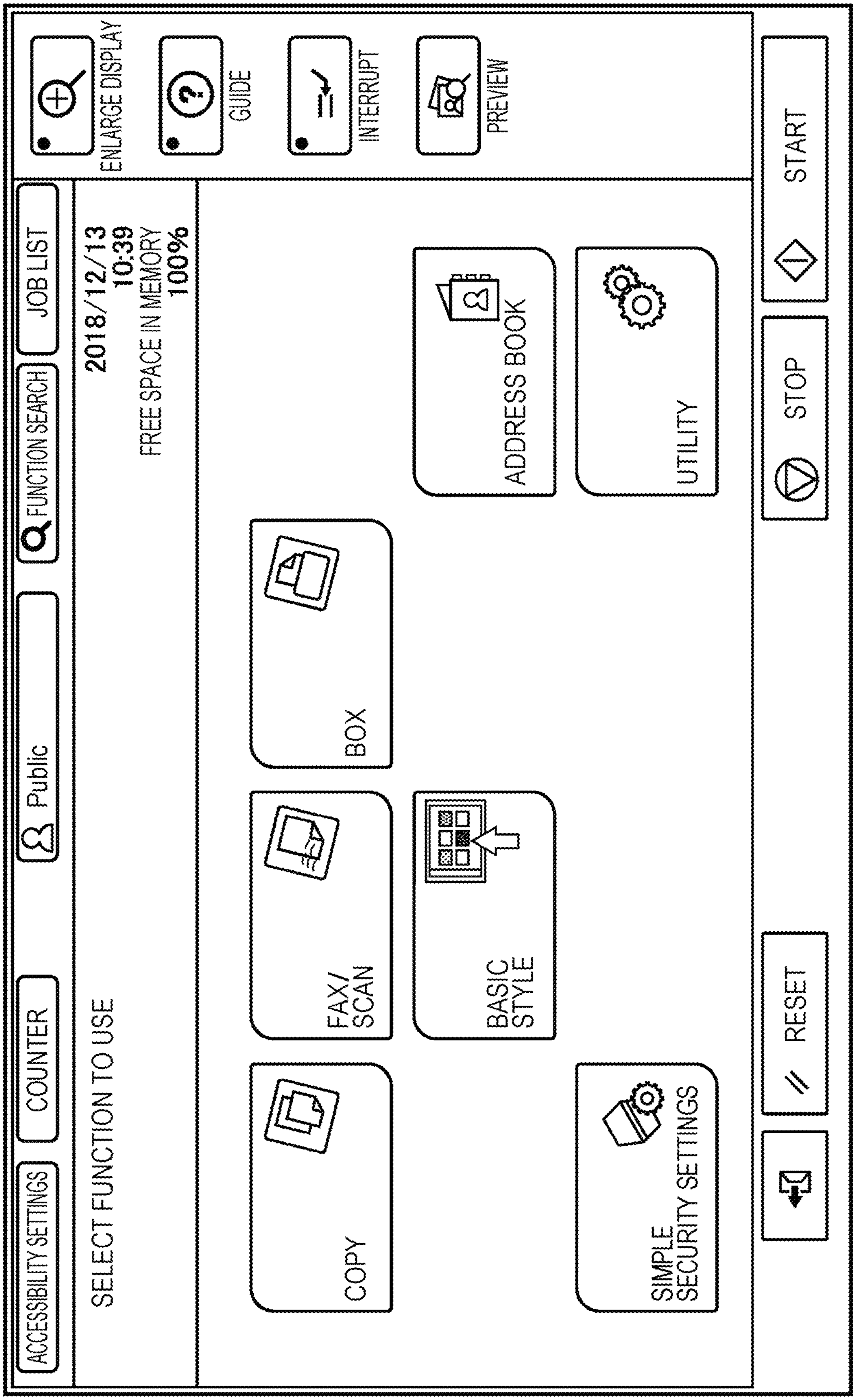
FIG. 13 is a view illustrating a top menu screen to be displayed on an operation display of the image forming apparatus.
Figure 14:
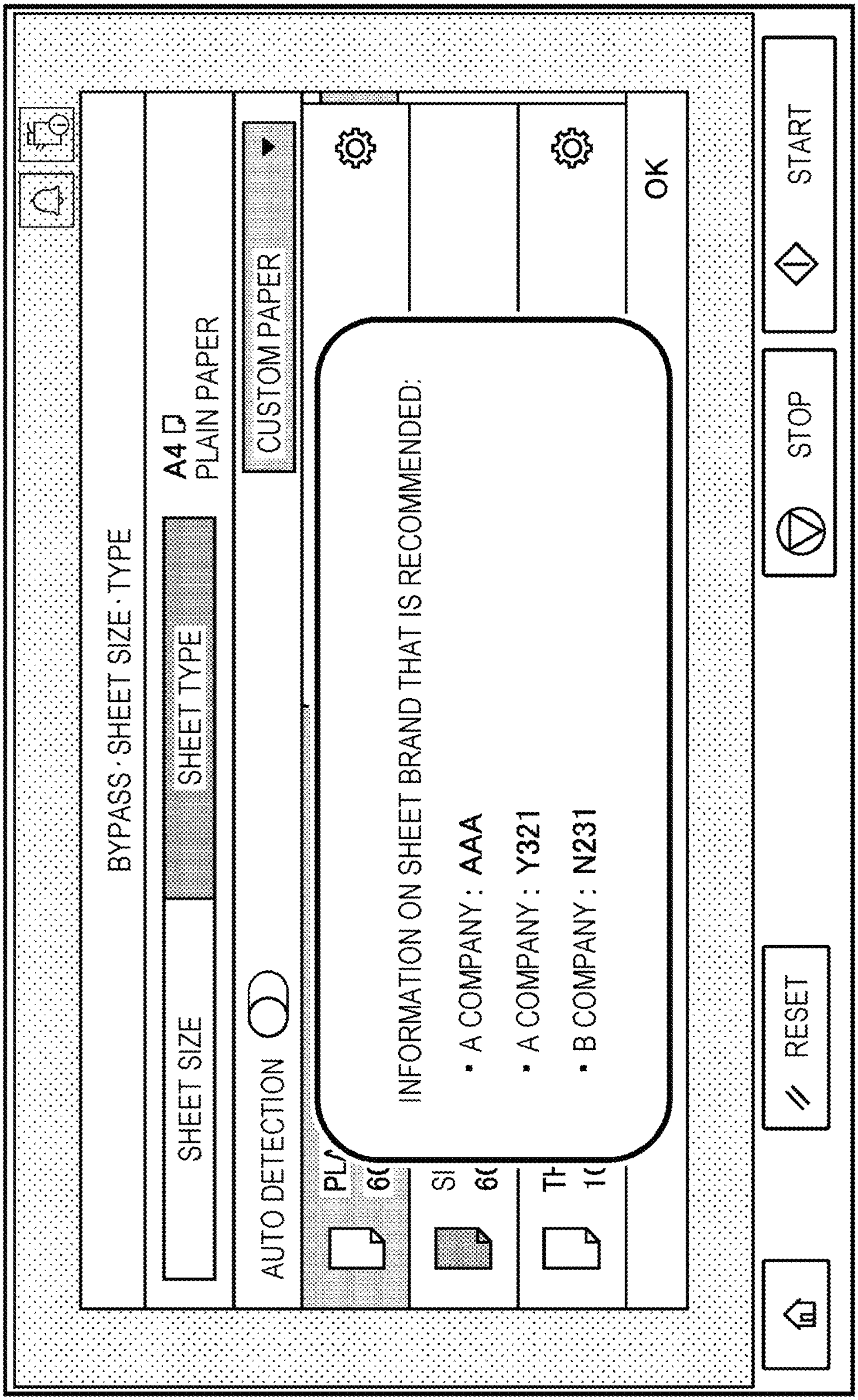
FIG. 14 is a view illustrating a popup screen for information on a sheet brand that is recommended to be displayed on the operation display of the image forming apparatus when a paper type has been selected.

FIG. 13 is a view illustrating a top menu screen to be displayed on the operation display 13 of the image forming apparatus 10. FIG. 14 is a view illustrating a popup screen for the information on a sheet brand that is recommended to be displayed on the operation display 13 of the image forming apparatus 10 when the paper type has been selected.

In the top menu screen illustrated in FIG. 13, when the user selects a “copy” button, the screen transitions to a selection screen. In the selection screen, when the user selects a “sheet type” and selects any of paper types, a popup screen for the information on a sheet brand that is recommended regarding the selected paper type is displayed as illustrated in FIG. 14. In FIG. 14, when the paper type of plain paper is selected, the popup screen for the information on a sheet brand that is recommended regarding plain paper, which is the selected paper type, is displayed.

In FIG. 14, as the information on a sheet brand that is recommended, a sheet brand that is recommended for use in the image forming apparatus 10 and the manufacturer information of the sheet brand are displayed. Specifically, “AAA”, “Y321,” and “N231” are displayed as the sheet brand that is recommended for use in the image forming apparatus 10. As the manufacturer information of the sheet S that is recommended for use in the image forming apparatus 10, “A company”, which is the manufacturer of “AAA” and “Y321”, and “B company”, which is the manufacturer of “N231”, are displayed.

When the paper type is selected, a popup screen for information on a sheet brand that is not recommended may be displayed on the operation display 13 of the image forming apparatus 10, instead of the popup screen for the information on a sheet brand that is recommended, or together with the popup screen for the information on a sheet brand that is recommended.

Figure 15:
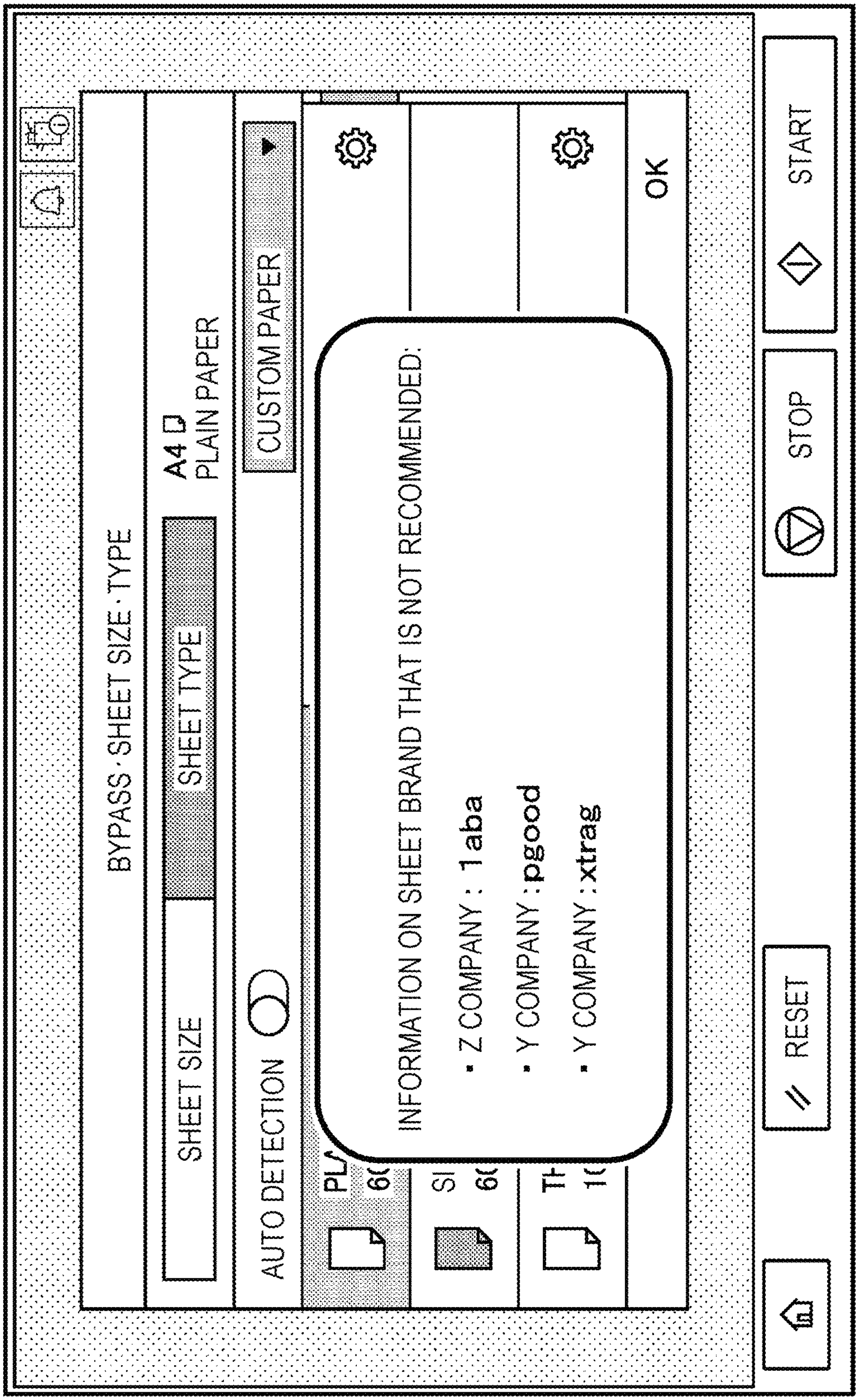
FIG. 15 is a view illustrating a popup screen for information on a sheet brand that is not recommended to be displayed on the operation display of the image forming apparatus when the paper type has been selected.

FIG. 15 is a view illustrating a popup screen for the information on a sheet brand that is not recommended to be displayed on the operation display 13 of the image forming apparatus 10 when the paper type has been selected.

In FIG. 15, when the paper type of plain paper is selected, the popup screen for the information on a sheet brand that is not recommended regarding plain paper, which is the selected paper type, is displayed.

In FIG. 15, as the information on a sheet brand that is not recommended, a sheet brand that is not recommended for use in the image forming apparatus 10 and the manufacturer information of the sheet brand are displayed. Specifically, “laba”, “pgood”, and “xtrag” are displayed as the sheet brand that is not recommended for use in the image forming apparatus 10. As the manufacturer information of the sheet S that is not recommended for use in the image forming apparatus 10, “Z company”, which is the manufacturer of “laba”, and “Y company”, which is the manufacturer of “pgood” and “xtrag” are displayed.

Terminal Device 30

The terminal device 30 accepts input or update of the sheet brand reference data by the user and transmits the input or updated sheet brand reference data to the server 20, thereby registering or updating the sheet brand reference data.

Operations of the information processing system 1 will be described.

Figure 16:
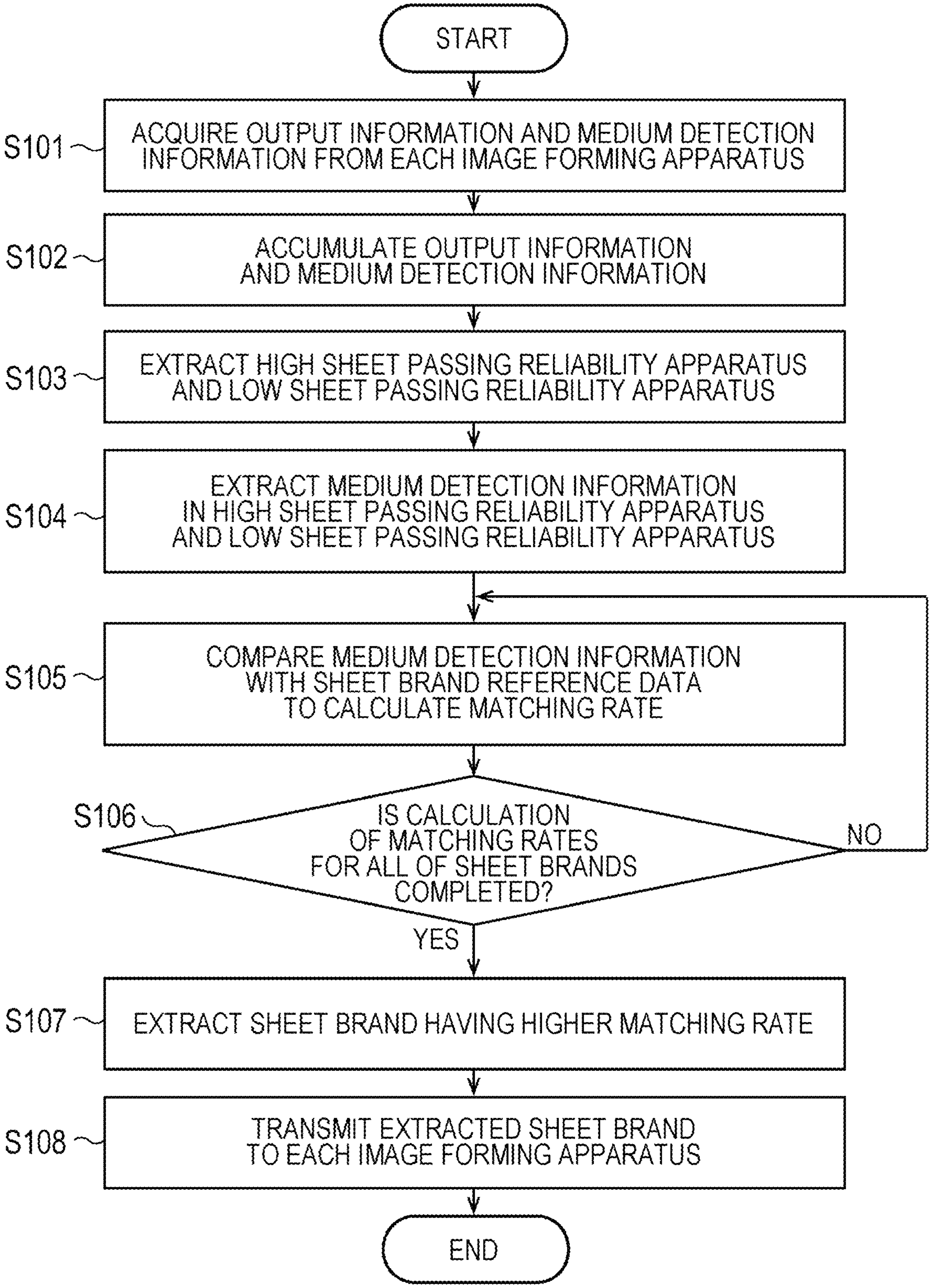
FIG. 16 is a flowchart illustrating operations of the information processing system.

FIG. 16 is a flowchart illustrating the operations of the information processing system 1. The flowchart may be executed by the controller 21 of the server 20 according to a program.

The controller 21 acquires the output information and the medium detection information from each image forming apparatus 10 (S101).

The controller 21 accumulates the acquired output information and the acquired medium detection information in the accumulated information DB (S102).

The controller 21 extracts, based on the jam occurrence information and the number of passed sheets included in the output information of each image forming apparatus 10 and accumulated in the accumulated information DB, the high sheet passing reliability apparatus and the low sheet passing reliability apparatus (S103).

The controller 21 extracts, from the accumulated information DB, the medium detection information detected in each of the high sheet passing reliability apparatus and the low sheet passing reliability apparatus (S104).

The controller 21 compares the extracted medium detection information with the sheet brand reference data to calculate the matching rate between the medium detection information and the physical property values of each sheet brand in the sheet brand reference data (S105).

The controller 21 determines whether or not the calculation of the matching rates for all of the sheet brands included in the sheet brand reference data is completed (S106).

In a case of determining that the calculation of the matching rates for all of the sheet brands is not completed (S106: NO), the controller 21 repeatedly executes the step S105 and the step S106 until the calculation of the matching rates for all of the sheet brands is completed.

In a case of determining that the calculation of the matching rates for all of the sheet brands is completed (S106: YES), the controller 21 extracts, as the information on a sheet that is recommended for use in the image forming apparatus 10, a sheet brand having the physical property values with a higher matching rate with the medium detection information detected in the high sheet passing reliability apparatus. The controller 21 extracts, as the information on a sheet that is not recommended for use in the image forming apparatus 10, a sheet brand having the physical property values with a higher matching rate with the medium detection information detected in the low sheet passing reliability apparatus.

The controller transmits, to each image forming apparatus 10, the extracted sheet brand as the information on a sheet that is recommended for use in the image forming apparatus 10, and the extracted sheet brand as the information on a sheet that is not recommended for use in the image forming apparatus 10 (S108).

Modification 1

The functions of the server 20 may be implemented by the image forming apparatus 10. That is, the server 20 may be installed in the image forming apparatus 10. In this case, each of the image forming apparatus 10 may include the function of the server 20, or only any one of the plurality of image forming apparatuses 10 communicably connected to each other may include the function of the server 20. In addition, the image forming apparatus 10 may include only some of the functions of the server 20.

Modification 2

As the high sheet passing reliability apparatus, a plurality of (for example, two or three) image forming apparatuses having a higher rank in the high sheet passing reliability apparatus ranking may be extracted. In this case, only a sheet brand having the highest matching rate with the physical property values of the sheet S passed through each of the extracted plurality of high sheet passing reliability apparatuses may be determined, as the sheet brand that is recommended for use in the image forming apparatus 10. Similarly, as the low sheet passing reliability apparatus, a plurality of (for example, two or three) image forming apparatuses having a higher rank in the low sheet passing reliability apparatus ranking may be extracted. In this case, only a sheet brand having the highest matching rate with the physical property values of the sheet S passed through each of the extracted plurality of low sheet passing reliability apparatuses may be determined, as the sheet brand that is not recommended for use in the image forming apparatus 10.

Modification 3

In the description of the above-described embodiment, the sheet S is plain paper. However, the sheet S to be passed through the image forming apparatus 10 may be, for example, thin paper, thick paper, recycled paper, or coated paper, which are paper types other than plain paper. In addition, the medium detection information, the print setting information, and the output information transmitted from the image forming apparatus 10 to the server 20 may include information of a plurality of paper types different from each other. In this case, the controller 21 may extract the high sheet passing reliability apparatus and the low sheet passing reliability apparatus for each paper type by sorting the medium detection information, the print setting information, and the output information for each paper type based on the paper type included in the print setting information. Then, the sheet brand that is recommended for use in the image forming apparatus 10 and the sheet brand that is not recommended for use in the image forming apparatus 10 may be determined for each paper type.

The present embodiment has the following effects.

Based on the output information on a recording medium on which an image is formed and the recording medium-related information acquired from the image forming apparatus, the information on a recording medium that is recommended for use in the image forming apparatus or the information on a recording medium that is not recommended for use in the image forming apparatus is determined. Accordingly, it is possible to easily recognize an appropriate recording medium, thereby suppressing the occurrence of a trouble such as a paper jam.

Further, the output information includes the information on whether or not printing has been normally performed on a recording medium or the information on the number of printed recording media. Accordingly, it is possible to effectively and easily recognize an appropriate recording medium while suppressing an increase in the calculation load.

Further, the recording medium-related information includes the setting information regarding a recording medium or the physical property information regarding a recording medium. Accordingly, it is possible to effectively and easily recognize an appropriate recording medium while suppressing an increase in the calculation load.

Further, the information on a recording medium includes the brand information of a recording medium or the manufacturer information of a recording medium. Accordingly, it is possible to recognize an appropriate recording medium more easily.

Further, the image forming apparatus includes a detection section that detects the physical property of a recording medium. Based on the detection values of a recording medium detected by the detection section and the output information of the recording medium, the information on a recording medium that is recommended for use in the image forming apparatus or the information on a recording medium that is not recommended for use in the image forming apparatus is determined. Accordingly, it is possible to easily recognize an appropriate recording medium while suppressing an increase in the scale of apparatuses and the cost.

Further, by referring to the table defining the relationship between the physical property values of a recording medium and the information of the recording medium, the information on a recording medium that is recommended for use in the image forming apparatus or the information on a recording medium that is not recommended for use in the image forming apparatus is determined. Accordingly, it is possible to flexibly and appropriately recognize an appropriate recording medium.

Further, the information processing apparatus is connected to a plurality of the image forming apparatuses via a network to acquire the output information from the plurality of image forming apparatuses. Accordingly, it is possible to share the information processing apparatus among the plurality of image forming apparatuses, thereby suppressing the specification change or the like of existing image forming apparatuses.

Further, the information processing apparatus includes the storing section that stores the acquired output information. Thus, by accumulating the output information, it is possible to improve determination accuracy of an appropriate recording medium.

Further, the information processing apparatus includes a transmission section that transmits the determination result to the image forming apparatus. Accordingly, it is possible to easily determine an appropriate recording medium for each image forming apparatus when image formation is executed.

Further, the information processing apparatus is installed in the image forming apparatus or is connected to the image forming apparatus via a network. Accordingly, it is possible to reduce the scale of apparatuses. Alternatively, it is possible to suppress the specification change or the like of existing image forming apparatuses.

The configuration of the information processing system 1 described above is the main configuration for describing the features of the above-described embodiment, and the present invention is not limited to the above-described configuration and can be variously modified within the scope of the claims. In addition, configurations included in a general information processing system are not excluded.

For example, some of the steps in the above-described flowchart may be omitted, and other steps may be added. In addition, some of the steps may be executed at the same time, and one step may be divided into a plurality of steps to be executed.

Furthermore, the means and method for performing various kinds of processing in the above-described system can be implemented by either a dedicated hardware circuit or a programmed computer. For example, the program may be provided by a computer-readable recording medium such as a USB memory or a digital versatile disc (DVD)-ROM, or may be provided online via a network such as the Internet. In this case, the program recorded on the computer-readable recording medium is usually transferred to and stored in a storage such as a hard disk. In addition, the program may be provided as a single piece of application software, or may be incorporated, as a function, into software for an apparatus such as a detector.

Although embodiments of the present invention have been described and illustrated in detail, the disclosed embodiments are made for purpose of illustration and example only and not limitation. The scope of the present invention should be interpreted by terms of the appended claims.

What is claimed is:

1. An information processing apparatus comprising:
a hardware processor that:
acquires output information of a recording medium on which an image is formed by an image forming apparatus and recording medium-related information; and
determines, based on the output information and the recording medium-related information that is acquired, and at least in part on output information and medium detection information accumulated over a period of time in an accumulated information database, information on a recording medium that is recommended for use in the image forming apparatus er and information on a recording medium that is not recommended for use in the image forming apparatus.

2. The information processing apparatus according to claim 1, wherein
the output information includes information on whether or not printing has been normally performed on the recording medium or information on the number of printed recording media.

3. The information processing apparatus according to claim 1, wherein
the recording medium-related information includes setting information regarding the recording medium or physical property information regarding the recording medium.

4. The information processing apparatus according to claim 1, wherein
the information on the recording medium includes brand information of the recording medium or manufacturer information of the recording medium.

5. The information processing apparatus according to claim 1, wherein
the hardware processor detects a physical property of a recording medium, and
determines, based on a detection value of a recording medium that is detected and the output information of the recording medium, the information on the recording medium that is recommended for use in the image forming apparatus or the information on the recording medium that is not recommended for use in the image forming apparatus.

6. The information processing apparatus according to claim 1, wherein
the hardware processor determines, by referring to a table defining relationship between a physical property value of the recording medium and the information on the recording medium, the information on the recording medium that is recommended for use in the image forming apparatus or the information on the recording medium that is not recommended for use in the image forming apparatus.

7. The information processing apparatus according to claim 1, wherein
the information processing apparatus is connected to a plurality of the image forming apparatuses via a network, and
the hardware processor acquires the output information from the plurality of the image forming apparatuses.

8. The information processing apparatus according to claim 1, wherein
the hardware processor causes a storage to store the output information that is acquired.

9. The information processing apparatus according to claim 1, wherein the hardware processor causes a transmitter to transmit, to the image forming apparatus, a determination result by the hardware processor.

10. The information processing apparatus according to claim 1, wherein the information processing apparatus is installed in the image forming apparatus or is connected to the image forming apparatus via a network.

11. A non-transitory recording medium storing a computer readable control program for causing a computer to perform:

acquiring output information of a recording medium on which an image is formed by an image forming apparatus and recording medium-related information; and determining, based on the output information and the recording medium-related information that is acquired, and at least in part on output information and medium detection information accumulated over a period of time in an accumulated information database, information on a recording medium that is recommended for use in the image forming apparatus and information on a recording medium that is not recommended for use in the image forming apparatus.

* * * * *